United States Patent [19]
Toratani

[11] 3,985,043
[45] Oct. 12, 1976

[54] FLY-WHEEL FOR TAPE RECORDER

[75] Inventor: Takehiko Toratani, Iwaki, Japan

[73] Assignee: Alps Motorola, Inc., Tokyo, Japan

[22] Filed: Jan. 27, 1975

[21] Appl. No.: 544,492

[30] Foreign Application Priority Data
Feb. 28, 1974   Japan.......................... 49-24174[U]

[52] U.S. Cl................................. 74/572; 226/190
[51] Int. Cl.²........................................ F16C 15/00
[58] Field of Search ............ 74/572, 206, 214, 215, 74/216; 271/272–274, 264; 29/123, 125, 129, 129.5, 130; 226/190

[56] References Cited
UNITED STATES PATENTS

| | | | |
|---|---|---|---|
| 1,443,337 | 1/1923 | Atwood | 74/214 |
| 1,908,187 | 5/1933 | Ross | 74/572 |
| 1,979,561 | 11/1934 | Lewis | 74/206 |
| 2,085,230 | 6/1937 | Rosenberg | 74/572 |
| 3,133,449 | 5/1964 | Van Antwerp et al. | 74/216 |
| 3,289,487 | 12/1966 | Weedfall | 74/214 |

*Primary Examiner*—Benjamin W. Wyche
*Assistant Examiner*—F. D. Shoemaker
*Attorney, Agent, or Firm*—Donald J. Lisa; James W. Gillman

[57] ABSTRACT

A fly-wheel for a tape recorder has a cup-shaped plate member fixed to the capstan shaft, and a ring-shaped member fixed to the cup-shaped plate member to reduce the weight and cost of the fly-wheel.

11 Claims, 7 Drawing Figures

FLY-WHEEL FOR TAPE RECORDER

BACKGROUND OF THE INVENTION

This invention relates to a fly-wheel for a tape recorder.

Conventional fly-wheels for a tape recorder or tape players generally comprise a relatively heavy zinc die casting securely fitted to a capstan shaft. If the wall thickness of the casting is reduced in order to decrease its weight and material, misruns may occur, resulting in the production of non-uniform and mechanically weak products. For this reason, a conventional fly-wheel for a tape recorder inevitably has a rather thick wall and, therefore, is heavy and not suitable for a portable tape recorder. In addition, the thick wall increases the amount of material used, and this results in increased costs, which have been accelerated by the steep rise in material costs in recent years.

It is desirable, therefore, to eliminate the aforementioned disadvantages of a conventional fly-wheel for a tape recorder and to provide a new and novel fly-wheel.

SUMMARY OF THE INVENTION

It is an object of the present invention to provide an improved fly-wheel for a tape recorder.

It is an additional object of the present invention to provide an improved thin walled, light-weight fly-wheel for a tape recorder.

It is another object of the present invention to provide a fly-wheel for a tape recorder which uses a reduced amount of material and, therefore, is inexpensive.

It is still another object of the present invention to provide a fly-wheel for a tape recorder which is suited for use in a portable tape recorder.

According to a preferred embodiment of the present invention, there is provided a fly-wheel for a tape recorder which comprises a capstan shaft, a cup-shaped plate member fixed to said capstan shaft, and a ring-shaped member press-fitted to the outside or inside circumferential surface of the cup-shaped plate member.

Other objects, features and advantages of the present invention will be more apparent from the following description taken in conjunction with the accompanying drawing.

DETAILED DESCRIPTION

Figure 1:
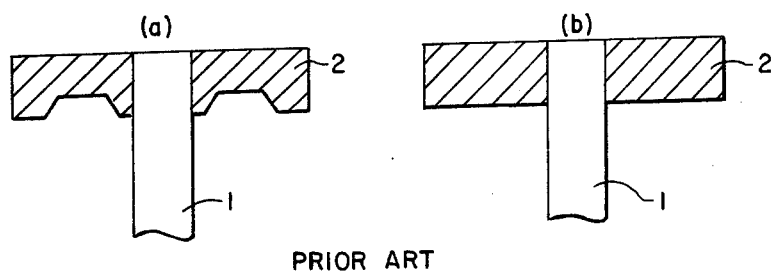
FIGS. 1(a) and 1(b) are sectional views of prior art fly-wheels for a tape recorder.

Reference is now made to the drawing in which like reference numerals designate the same or similar parts throughout the several figures. In addition, the term "tape recorder" also is intended to encompass tape players and tape recorders/players.

In FIG. 1 there are shown two versions of conventional prior art fly-wheel assemblies. In both of these versions, a capstan shaft 1 is provided with a die cast, relatively heavy, metal fly-wheel 2 which is fixed to the shaft 1. Typically, the fly-wheel 2 is a zinc die casting, which may include relief cutouts as shown in FIG. 1(a), or may be of a solid ring-shaped configuration as shown in FIG. 1(b). Both versions of these prior art fly-wheels, however, are subject to the disadvantages which have been mentioned above.

Figures 2, 3:
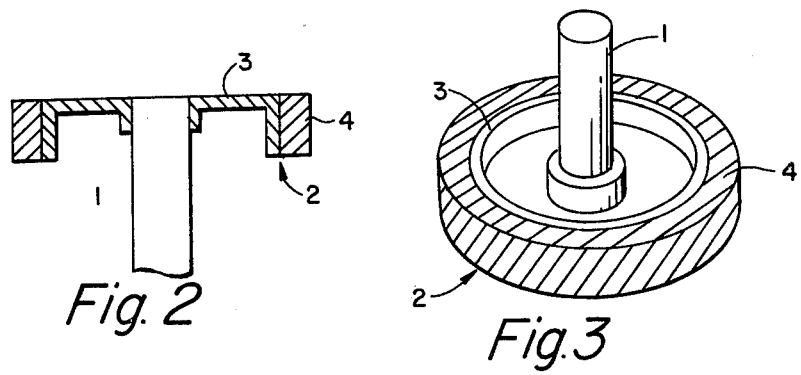
FIG. 2 is a sectional view of a fly-wheel for a tape recorder according to a preferred embodiment of the present invention.
FIG. 3 is a perspective view of the fly-wheel of FIG. 2, showing the rear side thereof.

FIGS. 2 and 3 illustrate a preferred embodiment of the present invention, showing a fly-wheel assembly which is mounted on a capstan shaft 1 supported on the main body of the tape recorder (not shown). A cup-shaped member 3, which may be formed from a flat metal plate, is press-fitted onto the capstan shaft 1. A ring-shaped weight member 4 then is press-fitted to the outside circumference of the cup-shaped member 3. Together the cup-shaped member 3 and the ring-shaped member 4 constitute a fly-wheel 2.

Figure 4:
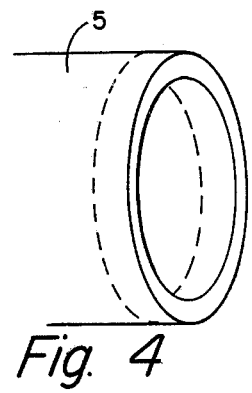
FIG. 4 is an explanatory view showing a production process of a ring-shaped member of a fly-wheel according to the present invention.

The cup-shaped member 3 may be produced by drawing a metal plate about 2 millimeters thick, and the ring-shaped member 4 may be produced by cutting a metal tube 5 (FIG. 4) of the proper diameter as indicated by the dotted line in FIG. 4 to a desired size.

Figure 5:
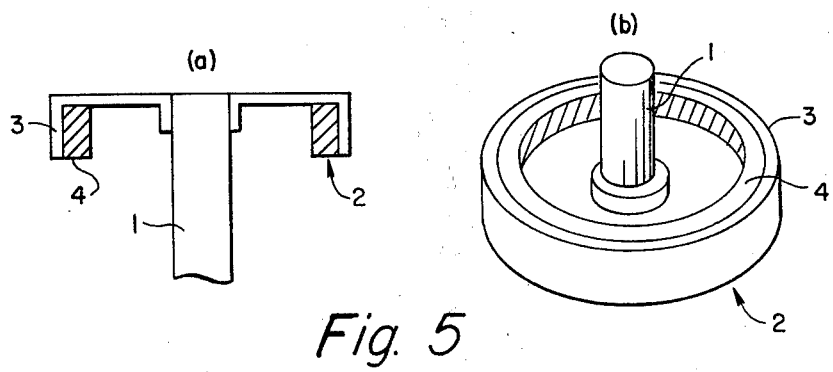
FIG. 5(a) is a sectional view of another embodiment of the invention.
FIG. 5(b) is a perspective view of the embodiment of FIG. 5(a), showing the rear side thereof.

FIGS. 5(a) and 5(b) illustrate another embodiment of the present invention in which a ring-shaped member 4, similar to the member 4 illustrated in FIGS. 2 and 3, is press-fitted to the internal circumference of a cup-shaped member 3 similar to the cup-shaped member 3 of FIGS. 2 and 3. In all other respects, the embodiment illustrated in FIG. 5 is the same as the embodiment illustrated in FIGS. 2 and 3.

It will be understood from the foregoing description that a fly-wheel for a tape recorder made in accordance with the present invention has a decreased wall thickness, thereby decreasing its weight and the quantity of material required to manufacture it. This results in decreased material costs and additionally makes the fly-wheel ideally suited for portable use, compared with a conventional fly-wheel of a zinc die casting, since the fly-wheel described above is lighter in weight.

I claim:

1. A fly-wheel for a tape recorder including in combination a capstan shaft, a cup-shaped plate member fixed at its center to said capstan shaft, and a metallic ring-shaped member fixed to the circumferential surface of said cup-shaped plate member, said ring-shaped member substantially having the shape of a section of a hollow metal tube.

2. The combination as set forth in claim 1, wherein said ring-shaped member is fixed to the internal circumferential surface of said cup-shaped member.

3. The combination as set forth in claim 1, wherein said ring-shaped member is fixed to the external circumferential surface of said cup-shaped member.

4. The combination as set forth in claim 1, wherein said cup-shaped member is press-fitted to said capstan shaft.

5. The combination as set forth in claim 4, wherein said ring-shaped member is press-fitted to said cup-shaped plate member.

6. The combination as set forth in claim 5, wherein said ring-shaped member is press-fitted to the external circumferential surface of said cup-shaped member.

7. The combination as set forth in claim 5, wherein said ring-shaped member is press-fitted to the internal circumferential surface of said cup-shaped member.

8. The combination as set forth in claim 5, wherein said ring-shaped member is a section of a hollow metal tube.

9. The combination as set forth in claim 8, wherein said cup-shaped member is metal.

10. A fly-wheel for a tape recorder including in combination a drive shaft, a cup-shaped plate member fixed at its center to said shaft for rotation about the axis of said shaft, and a substantially solid metallic ring-shaped member fixed to the circumferential surface of said cup-shaped plate member.

11. A fly-wheel for a tape recorder including in combination a drive shaft, a cup-shaped plate member fixed at its center to said shaft for rotation about the axis of said shaft, and a ring-shaped member means fixed to the circumferential surface of said cup-shaped plate member, said ring-shaped member means having a mass relative to the mass of the cup-shaped member for substantially increasing the rotational inertia of said fly-wheel about the axis of said shaft.

* * * * *